(12) United States Patent
Kim et al.

(10) Patent No.: US 7,689,177 B2
(45) Date of Patent: Mar. 30, 2010

(54) METHOD AND APPARATUS FOR TRANSMITTING/RECEIVING FEEDBACK INFORMATION AND SYSTEM SUPPORTING THE SAME IN A MULTI-USER MULTI-ANTENNA SYSTEM

(75) Inventors: Ho-Jin Kim, Seoul (KR); Seung-Young Park, Lafayette, IN (US); David J. Love, Lafayette, IN (US); Jianjun Li, Beijing (CN); Sung-Jin Kim, Suwon-si (KR); Il-Han Kim, Lafayette, IN (US)

(73) Assignees: Samsung Electronics Co., Ltd. (KR); Purdue Research Foundation, West Lafayette, IN (US)

( * ) Notice: Subject to any disclaimer, the term of this patent is extended or adjusted under 35 U.S.C. 154(b) by 481 days.

(21) Appl. No.: 11/802,568

(22) Filed: May 23, 2007

(65) Prior Publication Data

US 2008/0043865 A1 Feb. 21, 2008

Related U.S. Application Data

(60) Provisional application No. 60/802,794, filed on May 24, 2006.

(30) Foreign Application Priority Data

Sep. 15, 2006 (KR) .................. 10-2006-0089659

(51) Int. Cl.
*H04B 1/06* (2006.01)
(52) U.S. Cl. .................. 455/101; 455/562.1
(58) Field of Classification Search .............. 455/69, 455/70, 522, 561, 562.1, 575.1, 101, 103, 455/277.1, 277.2; 375/260, 267, 344, 347
See application file for complete search history.

(56) References Cited

U.S. PATENT DOCUMENTS

| | | | |
|---|---|---|---|
| 7,515,878 B2 * | 4/2009 | Zhang et al. | 455/69 |
| 2007/0254607 A1 * | 11/2007 | Bandemer et al. | 455/101 |
| 2007/0281746 A1 * | 12/2007 | Takano et al. | 455/562.1 |

\* cited by examiner

*Primary Examiner*—Thanh C Le
(74) *Attorney, Agent, or Firm*—NSIP Law

(57) ABSTRACT

A method and apparatus for transmitting/receiving feedback information in a multi-user multi-antenna system and a system supporting the same are provided, in which all possible combinations are created using column vectors included in a precoding codebook, column vectors are correlated in each of the combinations, column vectors comprising correlations exceeding a reference threshold are designated as similar vectors, at least two similar vector sets are formed with the similar vectors, and feedback information is generated based on the at least two similar vector sets and transmitted.

31 Claims, 5 Drawing Sheets

METHOD AND APPARATUS FOR
TRANSMITTING/RECEIVING FEEDBACK
INFORMATION AND SYSTEM SUPPORTING
THE SAME IN A MULTI-USER
MULTI-ANTENNA SYSTEM

CROSS-REFERENCE TO RELATED PATENT APPLICATION

This application claims the benefit under 35 U.S.C. §119(e) of a U.S. patent application filed in the U.S. Patent and Trademark Office on May 24, 2006 and assigned Ser. No. 60/802,794 and under 35 U.S.C. §119(a) of a Korean Patent Application filed in the Korean Intellectual Property Office on Sep. 15, 2006 and assigned Serial No. 2006-89659, the entire disclosures of both of which are hereby incorporated by reference.

BACKGROUND OF THE INVENTION

1. Field of the Invention

The present invention generally relates to a multi-user multi-antenna system using a closed-loop scheme. More particularly, the present invention relates to a method and apparatus for transmitting/receiving feedback information to support precoding and a system supporting the same.

2. Description of the Related Art

In general, compared to a wired channel, a wireless channel environment has low reliability due to multipath interference, shadowing, propagation attenuation, time-variant noise, and interference. This wireless channel environment is a major obstacle to increasing data rate in mobile communications.

In this context, Multiple Input Multiple Output (MIMO) has been proposed. The MIMO system is a major multi-antenna system.

The multi-antenna system supports both single-user mode and multi-user mode. Data is transmitted to a particular user through a plurality of transmitter antennas in the single-user mode, while data is transmitted to a plurality of users through a plurality of transmitter antennas in the multi-user mode.

Resource allocation in the multi-antenna system is performed by a closed loop using feedback information or an open loop without feedback information. Two types of feedback transmission are considered in a closed-loop multi-antenna system, that is, full feedback and single feedback.

In the full feedback scheme, when precoding is used, each user feeds back all data rates corresponding to all column vectors listed in a codebook. Despite the advantage of excellent performance, the full feedback requires a large amount of feedback information. Consequently, the complexity of creating feedback information increases and more resources are occupied to deliver the feedback information.

In the single feedback scheme, when precoding is used, each user feeds back only the index of a column vector with the highest data rate. Although the single feedback scheme reduces the amount of feedback information, it does not optimize resource allocation.

Efficient resource allocation with minimal feedback information is a significant issue to the closed-loop multi-antenna system. Efficient resource allocation is especially significant for reducing the amount of feedback information when multiple users are supported.

Accordingly, there is a need for an improved method and apparatus for improving system performance without increasing the amount of feedback information in a closed-loop multi-user multi-antenna system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a single-feedback method and apparatus for increasing data rate in a closed-loop multi-user multi-antenna system.

Another aspect of exemplary embodiments of the present invention is to provide a method and apparatus for generating sets of similar vectors using a predetermined precoding codebook and a system supporting the same.

A further aspect of exemplary embodiments of the present invention provides a method and apparatus for transmitting/receiving feedback information to achieve performance similar to the performance as achieved with using a plurality of Channel Quality Information (CQIs) as feedback information, despite a single-feedback scheme, and a system supporting the same.

Still another aspect of exemplary embodiments of the present invention is to provide a method and apparatus for transmitting/receiving feedback information, in which the index of a similar vector set and the CQI of the similar vector set are configured as feedback information, and a system supporting the same in a closed-loop multi-user multi-antenna system.

In accordance with an aspect of exemplary embodiments of the present invention, there is provided a method for transmitting feedback information in a closed-loop multi-user multi-antenna system. All possible combinations are created using column vectors included in a predetermined preceding codebook. Column vectors are correlated in each of the combinations. Column vectors having correlations exceeding a predetermined threshold are designated as similar vectors. At least two similar vector sets are formed with the similar vectors, and feedback information is generated based on the at least two similar vector sets and transmitted.

In accordance with another aspect of exemplary embodiments of the present invention, there is provided a method for receiving feedback information in a closed-loop multi-user multi-antenna system. All possible combinations are created using column vectors included in a predetermined precoding codebook. Column vectors are correlated in each of the combinations. Column vectors having correlations exceeding a predetermined threshold are designated as similar vectors. At least two similar vector sets are formed with the similar vectors. An index of a selected similar vector set and a data rate of the similar vector set are detected from feedback information received from each user. The detected data rate is applied commonly to all similar vectors in the selected similar vector set. The data rates applied to the similar vectors are applied to column vectors corresponding to the similar vectors in the codebook. Sum rates of unitary matrices included in the codebook are calculated using the data rates applied to the column vectors, and preceding is performed using a unitary matrix having the highest of the sum rates.

In accordance with a further aspect of exemplary embodiments of the present invention, there is provided an apparatus for transmitting feedback information in a closed-loop multi-user multi-antenna system. A channel estimator acquires CQIs of data streams corresponding to column vectors by performing channel estimation on a received signal. A feedback information generator creates all possible combinations using column vectors included in a predetermined precoding codebook, correlates column vectors in each of the combinations, designates column vectors having correlations exceeding a predetermined threshold as similar vectors, forms at least two similar vector sets with the similar vectors, generates feedback information based on the at least two similar vector sets, and transmits the feedback information.

In accordance with still another aspect of exemplary embodiments of the present invention, there is provided an apparatus for receiving feedback information in a closed-loop multi-user multi-antenna system. A feedback information processor detects an index of a selected similar vector set and a data rate of the similar vector set in feedback information received from each user, applies the detected data rate commonly to all similar vectors in the selected similar vector set, applies the data rates applied to the similar vectors to column vectors corresponding to the similar vectors in the codebook, and calculates sum rates of unitary matrices included in the codebook using the data rates applied to the column vectors. A signal transmitter performs precoding using a unitary matrix having the highest of the sum rates.

In accordance with yet another aspect of exemplary embodiments of the present invention, there is provided a closed-loop multi-user multi-antenna system. A Mobile Station (MS) creates all possible combinations using column vectors included in a predetermined precoding codebook, correlates column vectors in each of the combinations, designates column vectors having correlations exceeding a predetermined threshold as similar vectors, forms at least two similar vector sets with the similar vectors, generates feedback information based on the at least two similar vector sets, and transmits the feedback information. A Base Station (BS) detects an index of a selected similar vector set and a data rate of the similar vector set in feedback information received from each user, applies the detected data rate commonly to all similar vectors in the selected similar vector set, applies the data rates applied to the similar vectors to column vectors corresponding to the similar vectors in the codebook, calculates sum rates of unitary matrices included in the codebook using the data rates applied to the column vectors, and performs precoding using a unitary matrix having the highest of the sum rates.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
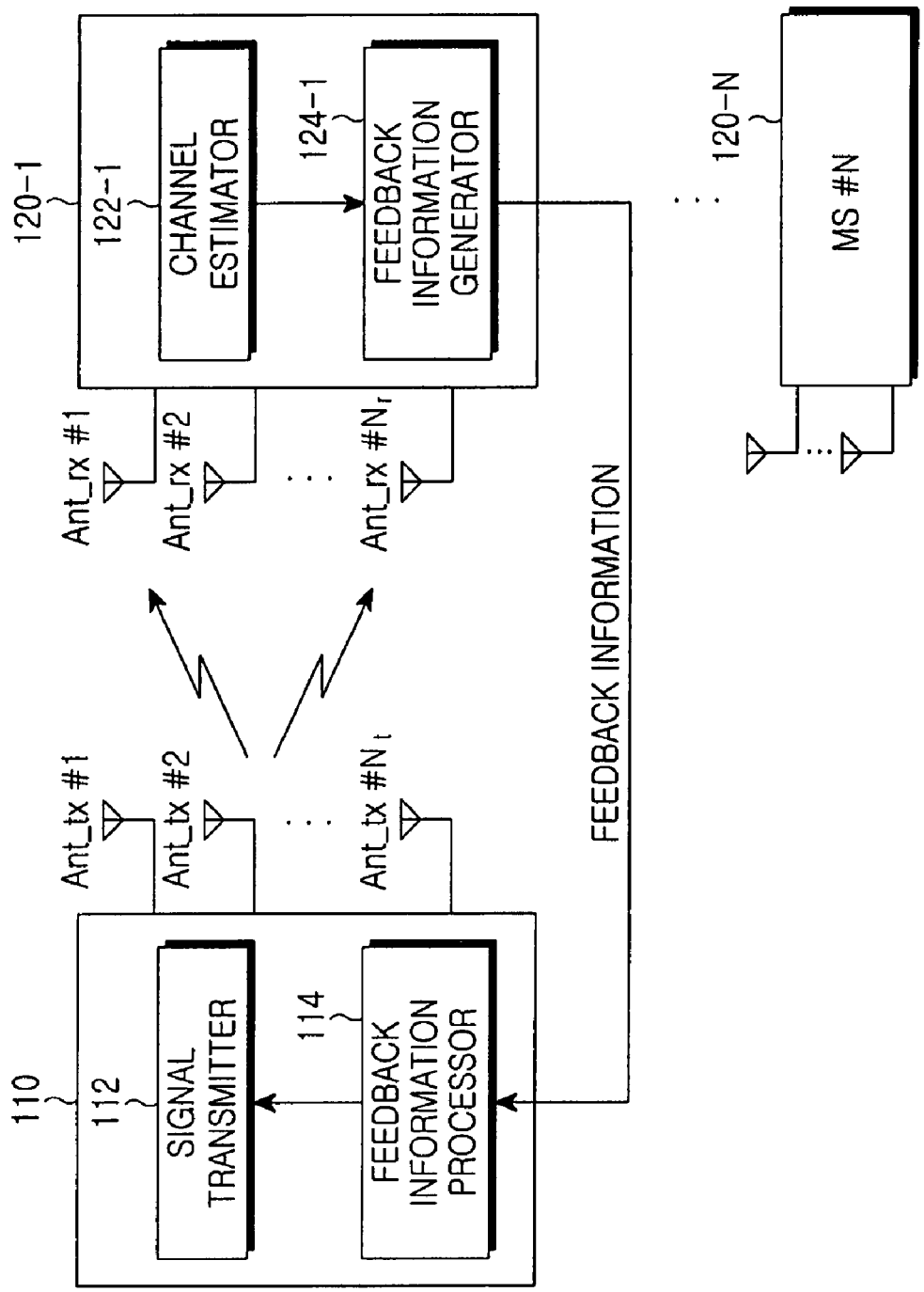
FIG. 1 is a block diagram of a closed-loop multi-user multi-antenna system according to an exemplary embodiment of the present invention.

FIG. 1 is a block diagram of a closed-loop multi-user multi-antenna system according to an exemplary embodiment of the present invention. In FIG. 1, the multi-antenna system includes a transmitter 110 and a plurality of receivers 120-1 to 120-N. It can be assumed that the transmitter 110 is a BS and the receivers 120-1 to 120-N are MSs. While one receiver 120-1 is described in detail, it is clear that the same description applies to the other receivers. Also, embodiments of the present invention are based on the premise that the transmitter 110 uses a precoder.

Referring to FIG. 1, in the receiver 120-1, a channel estimator 122-1 performs channel estimation using a received signal and acquires the CQIs (or CQI values) of data streams corresponding to the column vectors of each precoding matrix from the channel estimation.

A feedback information generator 124-1 generates feedback information based on the CQIs and correlations between similar vectors. Sets of similar vectors can be created using a predetermined codebook. Among all possible combinations that can be created using column vectors in the codebook, combinations each having column vectors with correlations satisfying a predetermined threshold are designated as similar vector sets. The creation of similar vector sets will be detailed later.

The feedback information generated in the feedback information generator 124-1 includes the index of one of the similar vector sets and the minimum of the data rates of similar vectors in the similar vector set. That is, the feedback information generator 124-1 calculates minimum data rates of the similar vector sets and sets the highest minimum data rate and the index of a similar vector set with the highest minimum data rate as feedback information.

In accordance with an exemplary embodiment of the present invention, every receiver generates its feedback information and transmits the feedback information to the transmitter 110.

In the transmitter 110, a feedback information processor 114 receives the feedback information from the receivers 120-1 to 120-N and selects at least one user (that is, receiver) and a unitary matrix for preceding based on the feedback information.

More specifically, the feedback information processor 114 applies the same data rate to the similar vectors of a similar vector set selected by each receiver. The data rate is known from the feedback information. The feedback information processor 114 calculates the sum rate of each unitary matrix by applying the data rates of the similar vectors to column vectors and selects a receiver corresponding to the highest sum rate and a unitary matrix having the highest sum rate. The feedback information processor 114 provides information about the selected receiver and unitary matrix to a signal transmitter 112.

The signal transmitter 112 precodes a data stream directed to the selected receiver with the selected unitary matrix and transmits the precoded data stream through a plurality of transmitter antennas.

Now a description will be made of an operation for generating similar vector sets using a codebook and transmitting feedback information based on the similar vector sets.

In general, a precoding codebook is composed of a predetermined number of unitary matrices. Being defined by the number of transmitter antennas, $M_{tx}$, each unitary matrix is an $M_{tx} \times M_{tx}$ matrix. A codebook with U unitary matrices is given as $$\{U_0, U_1, \ldots, U_{U-1}\} \tag{1}$$

and each unitary matrix is $$U_u = [u_{u,0}, \ldots u_{u,M_{tx}-1}], 0 \leq u \leq U-1 \tag{2}$$

where $u_{u,i}$ denotes an $i^{th}$ column vector in a $u^{th}$ unitary matrix.

A new codebook is formed using all possible combinations that can be created out of the column vectors of the unitary matrices. The new codebook includes at least one similar vector set with at least one similar vector.

How similar vectors are detected and grouped into a similar vector set will be described in detail. Also, a method for generating feedback information using the similar vector sets and transmitting the feedback information to a BS by an MS will be described.

The BS receives feedback information indicating selected similar vector sets and data rates of the similar vector sets and applies the same data rate to the similar vectors of each similar vector set. Then, the BS selects a precoding unitary matrix and a user by applying the data rates of the similar vectors to a conventional codebook. This operation will also be described in great detail.

Figure 2:
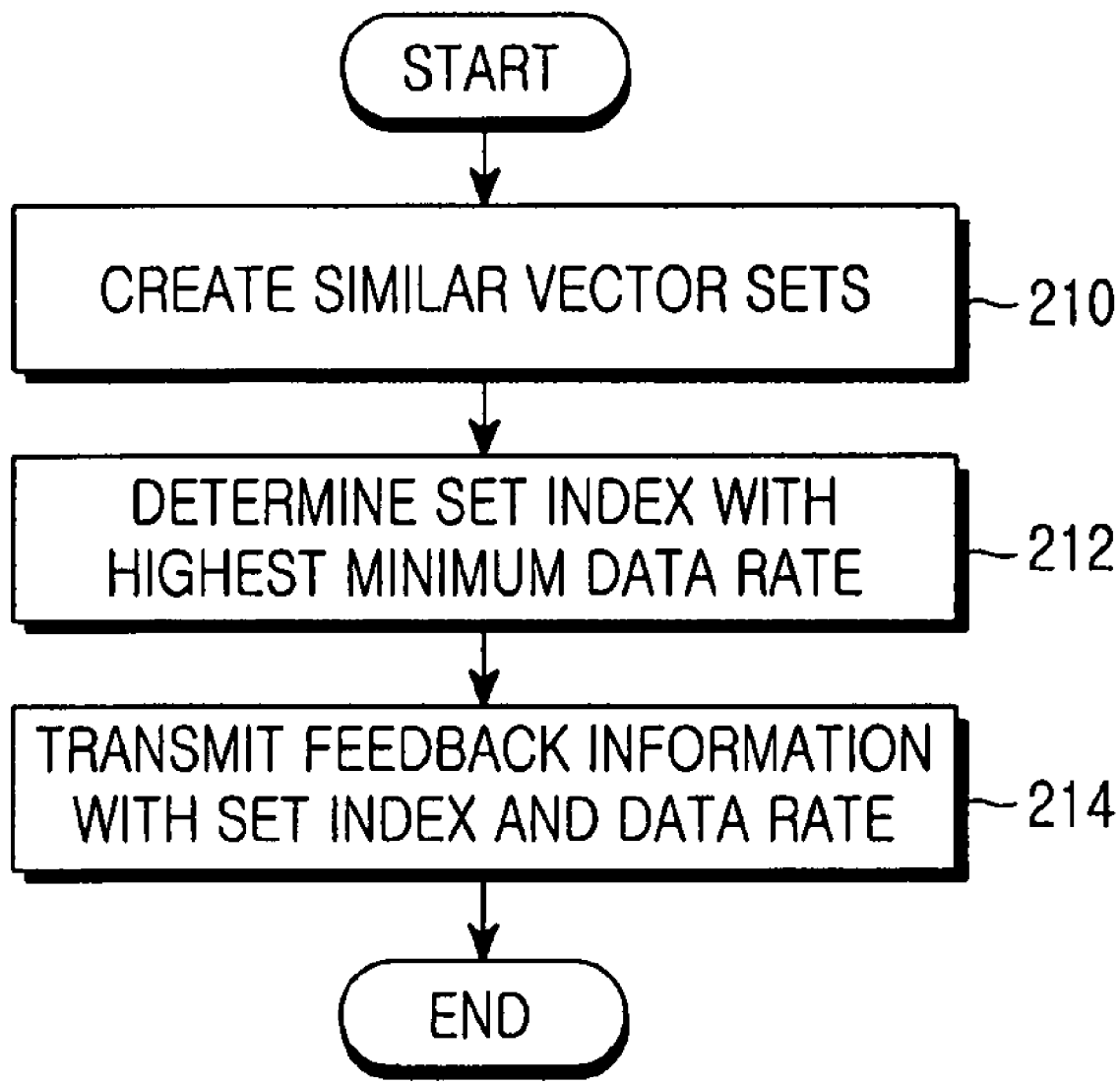
FIG. 2 is a flowchart illustrating a control operation of a Mobile Station (MS) in a closed-loop multi-antenna system according to an exemplary embodiment of the present invention.

FIG. 2 is a flowchart illustrating a control operation of an MS in a closed-loop multi-antenna system according to an exemplary embodiment of the present invention.

Referring to FIG. 2, the MS generates similar vector sets using all possible combination that can be created using column vectors in step 210. For this purpose, a similar vector detection condition is presented as Equation (3) and the similar vector sets $S_{u,i}$ are generated according to the similar vector detection condition.

$$S_{u,i} = \{u_{u',i'} : |u_{u',i'}^H u_{u,i}|^2 > \lambda, u \neq u', i \neq i'\} \tag{3}$$

where u denotes the index of a unitary matrix in the codebook, i denotes the index of a column vector in a unitary matrix U, and λ denotes a threshold for determining a similar vector. Preferably but not necessarily, λ is determined according to the number of users and the number of unitary matrices. As λ increases, the number of column vectors in each vector set increases, thereby increasing the number of feedback vectors. This is favorable when fewer users are serviced and the codebook is large in size.

As noted from Equation (3), a similar vector set can be generated with respect to each column vector $u_{u,i}$. Among all possible combinations that can be created by combining the column vector $u_{u,i}$ with the other column vectors, if a combination of column vectors satisfies Equation (3), it becomes a similar vector set. In the absence of any combination of column vectors satisfying Equation (3), there is no similar vector set for the column vector $u_{u,i}$.

The reason for grouping highly correlated column vectors as a similar vector set is to increase the probability of selecting similar vectors by each MS.

In step 212, the MS selects a similar vector set that maximizes the minimum of the data rates of similar vectors in the similar vector set according to Equation (4).

$$R_k = \max_{\{S_{u',i'}\}} \min_{u_{u,i} \in S_{u',i'}} R_k(u,i) \tag{4}$$

where k denotes the index of the MS.

According to Equation (4), the MS calculates the data rates $R_k(u,i)$ of the similar vectors $u_{u,i}$ of every similar vector set and selects the minimum of the data rates. Then the MS compares the minimum data rates of the similar vector sets and selects the highest minimum data rate.

Data rate calculation depends on signal detection. For example, if the MS adopts Zero Forcing (ZF), it calculates the data rates by $$R_k(u,i) = \log_2\left(1 + \frac{P}{M_{tx}} \cdot \frac{1}{[(H_k U_u)^H (H_k U_u)]_{i,i}^{-1}}\right) \text{ for } ZF \text{ receiver} \tag{5}$$

where $H_k$ denotes a $M_{tx} \times M_{tx}$ channel matrix under the assumption that the number of receiver antennas $M_{rx}$ is equal to or larger than the number of transmitter antennas $M_{tx}$, $R_k(u,i)$ denotes the data rate of an $i^{th}$ column vector of a $u^{th}$ unitary matrix for a $k^{th}$ user, and P denotes Signal-to-Noise Ratio (SNR).

If the MS adopts Minimum Mean Squared Error (MMSE), it calculates the data rates by $$R_k(u,i) = \tag{6}$$
$$\log_2\left(\frac{P}{M_{tx}} \cdot \frac{1}{\left[(H_k U_u)^H (H_k U_u) + \frac{M_{tx}}{P} I_M\right]_{i,i}^{-1}}\right) \text{ for } MMSE \text{ receiver}$$

where $H_k$ denotes a $M_{tx} \times M_{tx}$ channel matrix under the assumption that the number of receiver antennas $M_{rx}$ is equal to or larger than the number of transmitter antennas $M_{tx}$, $R_k(u,i)$ denotes the data rate of the $i^{th}$ column vector of the $u^{th}$ unitary matrix for the $k^{th}$ user, and P denotes SNR.

In step 214, the MS configures feedback information with the highest minimum data rate and the index of the similar vector set with the highest minimum data rate and transmits the feedback information to the BS.

Figure 3:
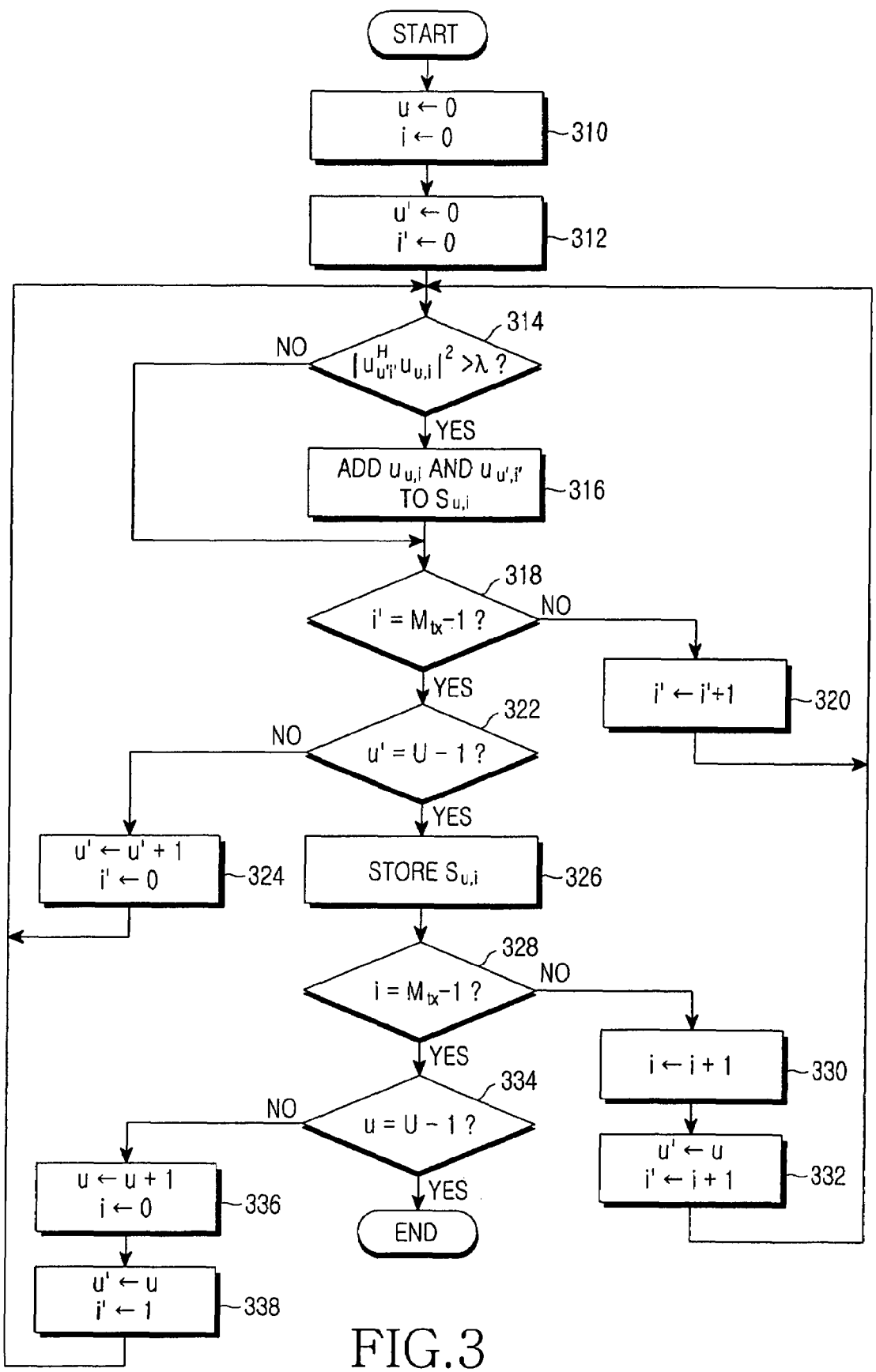
FIG. 3 is a flowchart illustrating a control operation for generating similar vector sets in the MS according to an exemplary embodiment of the present invention.

FIG. 3 is a flowchart illustrating a control operation for generating similar vector sets in the MS according to an exemplary embodiment of the present invention.

Referring to FIG. 3, the MS initializes a reference unitary matrix index u and a reference column index i to 0s in step 310. Matrix index u and reference column index i are a grouping index identifying a reference column vector $u_{u,i}$ for which to create a similar vector set $S_{u,i}$.

In step 312, the MS initializes a comparative unitary matrix index u' to 0 and sets a comparative column index i' to 1. Matrix index u' and reference column index i' identify a comparative column vector $u_{u',i'}$ by which to create the similar vector set $S_{u,i}$.

The MS correlates the reference column vector $u_{u,i}$ with the comparative column vector $u_{u',i'}$ and compares the correlation with a threshold λ by Equation (7) in step 314.

$$|u_{u',i'}{}^H u_{u,i}|^2 > \lambda \tag{7}$$

If the correlation is larger than the threshold, the MS designates the reference column vector $u_{u,i}$ and the comparative column vector $u_{u',i'}$ as similar vectors and adds them to the similar vector set $S_{u,i}$ in step 316 and proceeds to step 318. On the other hand, if the correlation is equal to or less than the threshold, the MS jumps to step 318 without designating the reference column vector $u_{u,i}$ and the comparative column vector $u_{u',i'}$ as similar vectors.

In step 318, the MS determines whether there remains another column vector to be designated as a comparative column vector in the same unitary matrix. If the comparative column index i' is equal to the total number of column vectors in the unitary matrix, the MS considers that there remain no more column vectors. The total number of column vectors is equal to the number of transmitter antennas, $M_{tx}$. Since the comparative column index starts from 0, the MS compares i' with $M_{tx}-1$ in step 318.

In the presence of another column vector, the MS increases i' by 1 in step 320 and repeats steps 314 through 320.

In the absence of any more column vectors in the same unitary matrix, the MS determines whether there is another unitary matrix in the codebook in step 322. If u' is identical to the total number U of unitary matrices in the codebook, the MS considers that there are no remaining unitary matrices. Unitary matrix U is determined according to the size of the codebook. Since the comparative unitary matrix index u' starts from 0, the MS compares u' with U−1 in step 322.

In the presence of another unitary matrix, the MS increases u' by 1 and initializes i' to 0 in step 324. That is, u' identifies the next unitary matrix and the column vectors of the next unitary matrix are sequentially selected, starting from the first column vector. Then the MS repeats steps 314 through 324.

In the absence of any more unitary matrices, the MS stores the generated similar vector set $S_{u,i}$ in step 326. In this manner, the similar vector set $S_{u,i}$ is completely generated with respect to the reference matrix index u and the reference column index i.

In steps 328 through 338, the MS selects the next reference column vector.

More specifically, the MS determines whether there is any more column vector to be designated as a reference column vector in the same unitary matrix. If i is equal to the total number of column vectors in the unitary matrix, the MS considers that there is no more column vector. That is, if i is equal to $(M_{tx}-1)$, the MS determines that the unitary matrix identified by the current reference matrix index u has no more column vectors.

In the presence of another column vector, the MS increases i by 1 to indicate the next column vector in step 330. In step 332, the MS initializes u' and i'. That is, u' is set to u and i' is set to (i+1) in order to prevent the new reference column vector from being designated as a comparative column vector or to prevent a previously selected combination from being reselected. Here, the combination means a combination of a reference column vector and a comparative column vector. Then the MS repeats steps 314 through 332.

In the absence of any more column vectors in the same unitary matrix, the MS determines whether there remains a unitary matrix from which a reference column vector can be selected in the codebook in step 334. If u is equal to the total number of unitary matrices in the codebook, the MS considers that no more unitary matrices remain. That is, if u is equal to (U−1), the MS determines that the codebook has no more unitary matrices.

In the presence of another unitary matrix, the MS increases u by 1 and initializes i to 0 in step 336. That is, u identifies the next unitary matrix and the column vectors of the next unitary matrix are sequentially selected.

In step 338, the MS initializes u' and i'. That is, u' is set to the changed u and i' is set to 1 to designate a column vector next to the reference column vector as a comparative column vector in the new unitary matrix, that is, to prevent the reference column vector from being identical to the comparative column vector. Then the MS repeats steps 314 through 338.

In the absence of any more unitary matrix to be designated as a reference unitary matrix, the MS determines that similar vector sets are completely created using all column vectors of the conventional codebook.

While the MS is responsible for generating similar vector sets in the above description, it can be further contemplated that the BS generates similar vector sets. Instead of the MS, the similar vector sets may be formed by use of an electronic device capable of performing the algorithm according to an exemplary embodiment of the present invention, such as a computer, and recorded in the MS or the BS.

Figure 4:
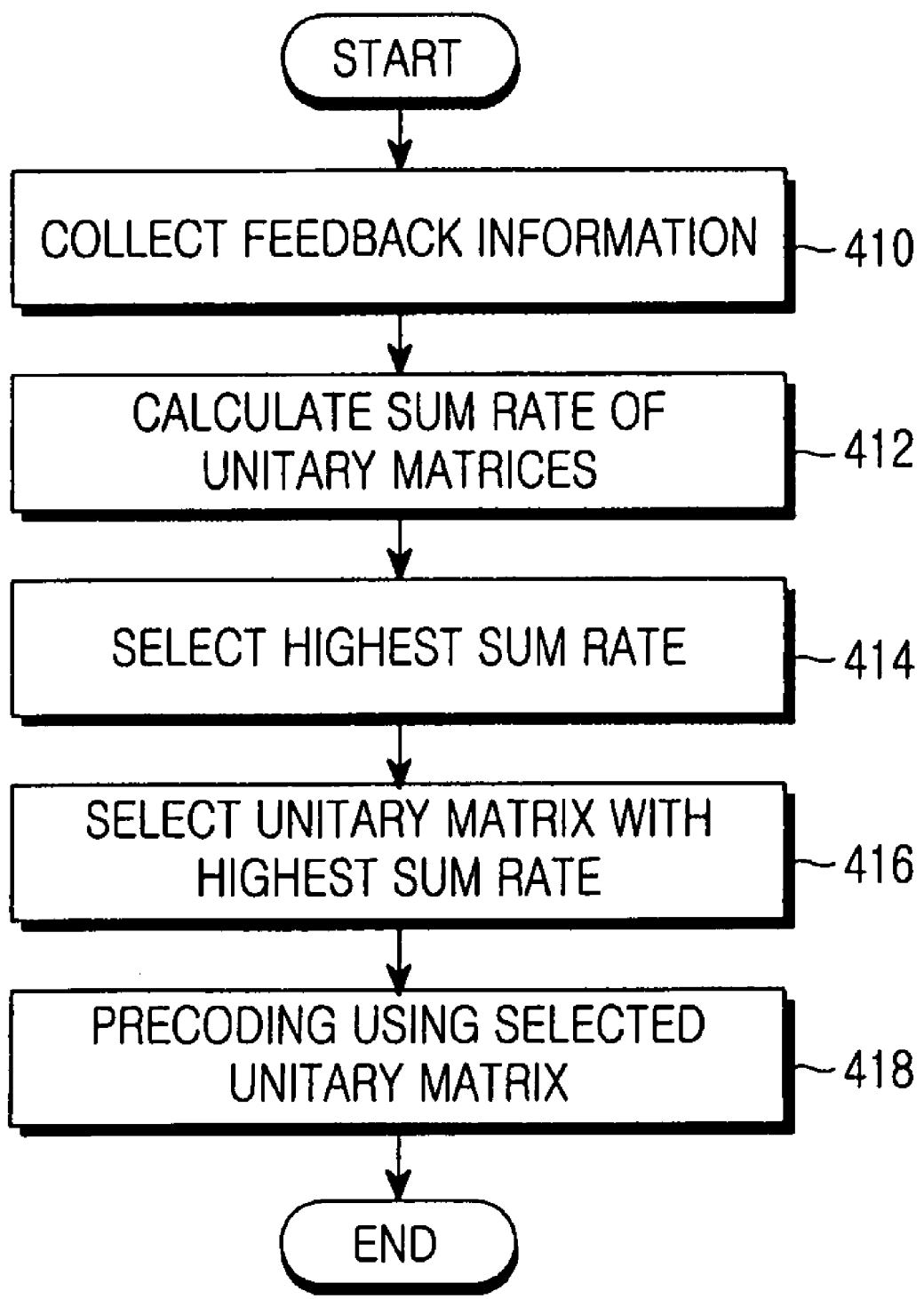
FIG. 4 is a flowchart illustrating a control operation of a Base Station (BS) in the closed-loop multi-antenna system according to an exemplary embodiment of the present invention.

FIG. 4 is a flowchart illustrating a control operation of the BS in the closed-loop multi-antenna system according to an exemplary embodiment of the present invention.

Referring to FIG. 4, the BS collects feedback information from each receiver in step 410. The feedback information contains the index of a similar vector set and the CQI of the similar vector set. The CQI is the minimum of the data rates of similar vectors in the similar vector set.

In step 412, the BS calculates the sum rate of every unitary matrix in the codebook using the feedback information. The data rate set in the feedback information is equally applied to at least one similar vector in the similar vector set identified by the index set in the feedback information. That is, $$R_k(u,i) = \underline{R}_k, \text{ where } u_{u,i} \in S_j \tag{8}$$

where $S_j$ denotes a $j^{th}$ similar vector set, j is a similar vector set index, $u_{u,i}$ denotes a similar vector in $S_j$, $\underline{R}_k$ denotes a data rate provided as feedback information from a $k^{th}$ user, and $R_k(u,i)$ denotes a data rate applied to $u_{u,i}$.

Therefore, although one data rate is provided by feedback information, the feedback information brings the effect of providing as many data rates for the similar vectors of a similar vector set.

For example, it is assumed that three users user #1, user #2 and user #3 exist, a codebook of size 3 is used, each unitary matrix in the codebook has four column vectors, given as $$U_0 = [u_{0,0}, u_{0,1}, u_{0,2}, u_{0,3}]$$

$$U_1 = [u_{1,0}, u_{1,1}, u_{1,2}, u_{1,3}]$$

$$U_2 = [u_{2,0}, u_{2,1}, u_{2,2}, u_{2,3}] \tag{9}$$

each of the users transmits feedback information expressed as Equation (10) and similar vector sets identified by indexes set in the feedback information are given as Equation (11).

$$\text{feedback}_{user\#1} = \{\text{set}_{index}(S_1), \text{rate}(2)\}$$

$$\text{feedback}_{user\#2} = \{\text{set}_{index}(S_2), \text{rate}(3)\}$$

$$\text{feedback}_{user\#3} = \{\text{set}_{index}(S_3), \text{rate}(5)\} \tag{10}$$

where $\text{set}_{index}(n)$ denotes a similar vector set index n and rate(m) denotes a minimum data rate supported by a similar vector in a similar vector set identified by the similar vector set index.

$$S_1 = [u_{0,0}, u_{1,3}]$$

$$S_2 = [u_{1,0}, u_{1,2}]$$

$$S_3 = [u_{0,1}, u_{2,1}] \quad (11)$$

where $S_k$ denotes a similar vector set identified by a similar vector set index included in the feedback information of the $k^{th}$ user.

Then, the BS determines that the similar vectors $u_{0,0}, u_{1,3}$ of $S_1$ have a data rate of 2, the similar vectors $u_{1,0}, u_{1,2}$ of $S_2$ have a data rate of 3, and the similar vectors $u_{0,1}, u_{2,1}$ of $S_3$ have a data rate of 5.

The BS calculates the sum rates of the unitary matrices given as Equation (9). Therefore, the sum rates of $U_0$, $U_1$ and $U_2$ are 7, 8 and 5, respectively.

In step 414, the BS selects the highest of the sum rates. This can be generalized to the following equation.

$$R = \max_{k,u} \sum_{i} R_k(u, i) \quad (12)$$

In step 416, the BS selects a $k^{th}$ user and a $u^{th}$ unitary matrix corresponding to the selected maximum sum rate. The BS then precodes a data stream for the $k^{th}$ user with the selected unitary matrix and transmits the precoded signal through a plurality of transmitter antennas in step 418.

Figure 5:
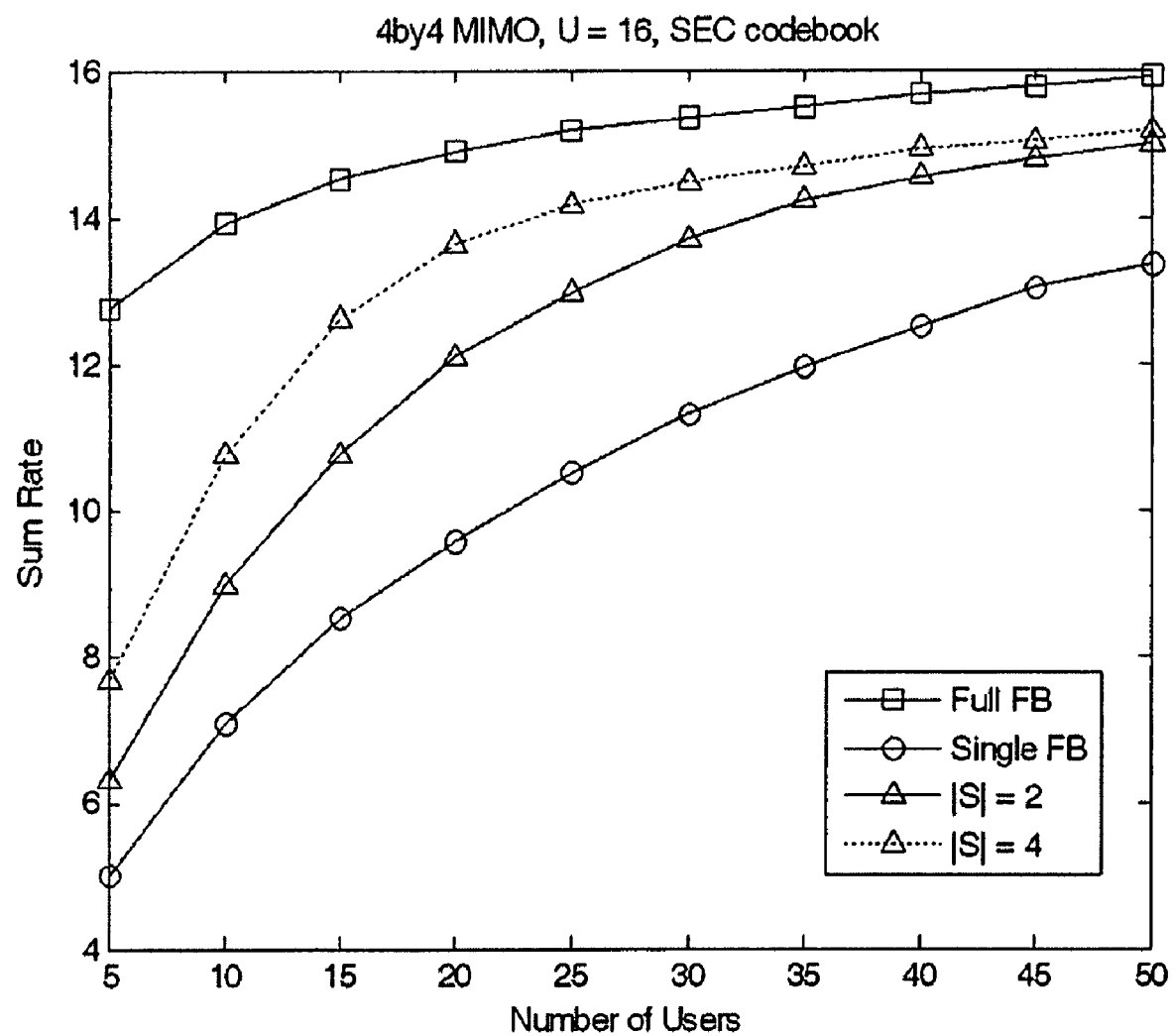
FIG. 5 is a graph comparing exemplary embodiments of the present invention with conventional methods in terms of performance.

FIG. 5 is a graph comparing embodiments of the present invention with conventional methods in terms of performance. A simulation was performed under the conditions that a multi-antenna system with four transmitter antennas and four receiver antennas and a codebook of size 16.

Referring to FIG. 5, the full feedback scheme performance improves but imposes load on the system due to a large amount of feedback information. Although the single feedback scheme reduces the amount of feedback information, the single feedback scheme performs worst.

Exemplary embodiments of the present invention approach the performance of the full feedback scheme with the same amount of feedback information as that used in the single feedback information.

The performance of exemplary embodiments of the present invention may vary with the type of precoding codebook. The simulation was performed using a codebook proposed by the present applicant.

As described above, exemplary embodiments of the present invention creates similar vector sets using a predetermined preceding codebook and transmits feedback information or performs precoding using the similar vectors. Therefore, while feedback information carries one CQI, it brings the effect of providing a plurality of CQIs. Further, even when a small number of users exist, exemplary embodiments of the present invention increase system performance without increasing feedback information.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting feedback information in a closed-loop multi-user multi-antenna system, comprising:
   creating possible combinations using column vectors included in a preceding codebook and correlating column vectors in each of the combinations;
   designating column vectors comprising correlations exceeding a reference threshold as similar vectors;
   forming at least two similar vector sets with the similar vectors; and
   generating feedback information based on the at least two similar vector sets and transmitting the feedback information.

2. The method of claim 1, wherein the generating of the feedback information comprises:
   calculating data rates supported by similar vectors of each of the at least two similar vector sets;
   selecting minimum data rates for the at least two similar vector sets;
   selecting the highest of the selected minimum data rates; and
   generating the feedback information with the highest minimum data rate and an index of a similar vector set with the highest minimum data rate.

3. The method of claim 1, wherein the correlation comprises:
   designating one of the column vectors in the codebook as a reference column vector;
   sequentially designating the other column vectors as comparative column vectors; and
   calculating correlations between the reference column vector and the comparative column vectors.

4. The method of claim 3, wherein the similar vector set formation comprises forming a similar vector set with respect to the reference column vector using comparative column vectors comprising correlations exceeding the reference threshold among the correlated comparative column vectors.

5. The method of claim 4, wherein the reference threshold is determined in proportion to a number of users.

6. The method of claim 4, wherein the similar vector set formation comprises forming the similar vector set $S_{u,i}$ by Equation (13)

$$S_{u,i}\{u_{u',i'}:|u_{u',i'}{}^H u_{u,i}|^2 > \lambda, u \neq u', i \neq i'\} \quad (13)$$

where u denotes the index of a unitary matrix in the codebook, i denotes the index of a column vector in a unitary matrix U, $\lambda$ denotes the threshold for determining a similar vector, $u_{u',i'}$ denotes a comparative column vector, and $u_{u,i}$ denotes the reference column vector.

7. A method for receiving feedback information in a closed-loop multi-user multi-antenna system, comprising:
   creating possible combinations using column vectors included in a precoding codebook and correlating column vectors in each of the combinations;
   designating column vectors comprising correlations exceeding a reference threshold as similar vectors;
   forming at least two similar vector sets with the similar vectors;
   detecting an index of a selected similar vector set and a data rate of the similar vector set in feedback information received from each user;
   applying the detected data rate commonly to similar vectors in the selected similar vector set;
   applying the data rates applied to the similar vectors to column vectors corresponding to the similar vectors in the codebook;
   calculating sum rates of unitary matrices included in the codebook using the data rates applied to the column vectors; and performing precoding using a unitary matrix comprising the highest of the sum rates.

8. The method of claim 7, wherein the correlation comprises:

designating one of the column vectors in the codebook as a reference column vector;

sequentially designating the other column vectors as comparative column vectors; and calculating correlations between the reference column vector and the comparative column vectors.

9. The method of claim 8, wherein the similar vector set formation comprises forming a similar vector set with respect to the reference column vector using comparative column vectors comprising correlations exceeding the reference threshold among the correlated comparative column vectors.

10. The method of claim 9, wherein the reference threshold is determined in proportion to a number of users.

11. The method of claim 9, wherein the similar vector set formation comprises forming the similar vector set $S_{u,i}$ by Equation (14)

$$S_{u,i} = \{u_{u',i'} : |u_{u',i'}^H u_{u,i}|^2 > \lambda, u \neq u', i \neq i'\} \quad (14)$$

where u denotes the index of a unitary matrix in the codebook, i denotes the index of a column vector in a unitary matrix U, $\lambda$ denotes the threshold for determining a similar vector, $u_{u',i'}$ denotes a comparative column vector, and $u_{u,i}$ denotes the reference column vector.

12. An apparatus for transmitting feedback information in a closed-loop multi-user multi-antenna system, comprising:

a channel estimator for acquiring Channel Quality Information (CQI) of data streams corresponding to column vectors by performing channel estimation on a received signal; and a feedback information generator for creating possible combinations using column vectors included in a precoding codebook, correlating column vectors in each of the combinations, designating column vectors comprising correlations exceeding a reference threshold as similar vectors, forming at least two similar vector sets with the similar vectors, generating feedback information based on the at least two similar vector sets, and transmitting the feedback information.

13. The apparatus of claim 12, wherein the feedback information generator calculates data rates supported by similar vectors of each of the at least two similar vector sets, selects minimum data rates for the at least two similar vector sets, selects the highest of the selected minimum data rates, and generates the feedback information with the highest minimum data rate and an index of a similar vector set with the highest minimum data rate.

14. The apparatus of claim 12, wherein the feedback information generator designates at least one of the column vectors in the codebook as a reference column vector, sequentially designates the other column vectors as comparative column vectors, and calculates correlations between the reference column vector and the comparative column vectors.

15. The apparatus of claim 14, wherein the feedback information generator forms a similar vector set with respect to the reference column vector using comparative column vectors comprising correlations exceeding the reference threshold among the correlated comparative column vectors.

16. The apparatus of claim 13, wherein the threshold is determined in proportion to a number of users.

17. The apparatus of claim 15, wherein the feedback information generator forms the similar vector set $S_{u,i}$ by Equation (15)

$$S_{u,i} = \{u_{u',i'} : |u_{u',i'}^H u_{u,i}|^2 > \lambda, u \neq u', i \neq i'\} \quad (15)$$

where u denotes the index of a unitary matrix in the codebook, i denotes the index of a column vector in a unitary matrix U, $\lambda$ denotes the threshold for determining a similar vector, $u_{u',i'}$ denotes a comparative column vector, and $u_{u,i}$ denotes the reference column vector.

18. An apparatus for receiving feedback information in a closed-loop multi-user multi-antenna system, comprising:

a feedback information processor for detecting an index of a selected similar vector set and a data rate of the similar vector set in feedback information received from each user, applying the detected data rate commonly to similar vectors in the selected similar vector set, applying the data rates applied to the similar vectors to column vectors corresponding to the similar vectors in the codebook, and calculating sum rates of unitary matrices included in the codebook using the data rates applied to the column vectors; and a signal transmitter for performing precoding using a unitary matrix comprising the highest of the sum rates.

19. The apparatus of claim 18, wherein the feedback information processor creates possible combinations using column vectors included in a precoding codebook, correlates column vectors in each of the combinations, designates column vectors comprising correlations exceeding a reference threshold as similar vectors, and forms at least two similar vector sets with the similar vectors.

20. The apparatus of claim 18, wherein the feedback information processor designates at least one of the column vectors in the codebook as a reference column vector, sequentially designates the other column vectors as comparative column vectors, and calculates correlations between the reference column vector and the comparative column vectors.

21. The apparatus of claim 20, wherein the feedback information processor forms a similar vector set with respect to the reference column vector using comparative column vectors comprising correlations exceeding the reference threshold among the correlated comparative column vectors.

22. The apparatus of claim 21, wherein the threshold is determined in proportion to a number of users.

23. The apparatus of claim 21, wherein the feedback information processor forms the similar vector set $S_{u,i}$ by Equation (16)

$$S_{u,i} = \{u_{u',i'} : |u_{u',i'}^H u_{u,i}|^2 > \lambda, u \neq u', i \neq i'\} \quad (16)$$

where u denotes the index of a unitary matrix in the codebook, i denotes the index of a column vector in a unitary matrix U, $\lambda$ denotes the threshold for determining a similar vector, $u_{u',i'}$ denotes a comparative column vector, and $u_{u,i}$ denotes the reference column vector.

24. A closed-loop multi-user multi-antenna system, comprising:

a Mobile Station (MS) for creating possible combinations using column vectors included in a precoding codebook, correlating column vectors in each of the combinations, designating column vectors comprising correlations exceeding a reference threshold as similar vectors, forming at least two similar vector sets with the similar vectors, generating feedback information based on the at least two similar vector sets, and transmitting the feedback information; and a Base Station (BS) for detecting an index of a selected similar vector set and a data rate of the similar vector set in feedback information received from each user, applying the detected data rate commonly to similar vectors in the selected similar vector set, applying the data rates applied to the similar vectors to column vectors corresponding to the similar vectors in the codebook, calculating sum rates of unitary matrices included in the codebook using the data rates applied to the column vectors, and performing precoding using a unitary matrix comprising the highest of the sum rates.

25. The closed-loop multi-user multi-antenna system of claim 24, wherein the MS calculates data rates supported by similar vectors of each of the at least two similar vector sets, selects minimum data rates for the at least two similar vector sets, selects the highest of the selected minimum data rates, and generates the feedback information with the highest minimum data rate and an index of a similar vector set with the highest minimum data rate.

26. The closed-loop multi-user multi-antenna system of claim 24 wherein the MS designates at least one of the column vectors in the codebook as a reference column vector, sequentially designates the other column vectors as comparative column vectors, and calculates correlations between the reference column vector and the comparative column vectors.

27. The closed-loop multi-user multi-antenna system of claim 26, wherein the MS forms a similar vector set with respect to the reference column vector using comparative column vectors comprising correlations exceeding the reference threshold among the correlated comparative column vectors.

28. The closed-loop multi-user multi-antenna system of claim 27, wherein the threshold is determined in proportion to a number of users.

29. The closed-loop multi-user multi-antenna system of claim 27, wherein the MS forms the similar vector set $S_{u,i}$ by Equation (17)

$$S_{u,i}=\{u_{u',i'}:|u_{u',i'}^H u_{u,i}|^2>\lambda,\ u\neq u',\ i\neq i'\} \quad (17)$$

where u denotes the index of a unitary matrix in the codebook, i denotes the index of a column vector in a unitary matrix U, $\lambda$ denotes the threshold for determining a similar vector, $u_{u',i'}$ denotes a comparative column vector, and $u_{u,i}$ denotes the reference column vector.

30. The method of claim 1, further comprising acquiring Channel Quality Information (CQI) of data streams corresponding to the column vectors by performing channel estimation on a received signal.

31. The method of claim 7, further comprising acquiring Channel Quality Information (CQI) of data streams corresponding to the column vectors by performing channel estimation on a received signal.

* * * * *